Aug. 24, 1943.  J. GOLDMANN  2,327,418
ENERGY TRANSITION SYSTEM
Filed Oct. 10, 1941  4 Sheets-Sheet 1

Inventor:
Joachim Goldmann
by
Attorney

Aug. 24, 1943. J. GOLDMANN 2,327,418
ENERGY TRANSITION SYSTEM
Filed Oct. 10, 1941 4 Sheets-Sheet 4

Inventor:
Joachim Goldmann
by
Attorney.

Patented Aug. 24, 1943

2,327,418

UNITED STATES PATENT OFFICE 2,327,418

ENERGY TRANSITION SYSTEM

Joachim Goldmann, Berlin, Germany; vested in the Alien Property Custodian

Application October 10, 1941, Serial No. 414,477
In Germany July 4, 1940

8 Claims.  (Cl. 178—44)

The present invention relates to a new and useful device for effecting energy transition from an asymmetrical high frequency transmission line to a symmetrical energy transmission line, or vice versa.

It is frequently desirable in high frequency systems to transfer electric high frequency energy from a symmetrical transmission line to an asymmetrical transmission line, for instance in the case of connecting a dipole antenna system to an amplifier or similar device.

The present invention has for its object to provide a transition device which particularly in the ultra-high frequency range permits an energy transfer from a symmetric energy line to an asymmetric energy line, or vice versa.

It is proposed according to this invention to form the asymmetric line as a coaxial conductor pair, to interrupt the outer conducting sheath of said coaxial conductor pair at a position in front of the end at which radiation is to be suppressed, and to connect the symmetric transmission line to the ends of said outer conducting sheath thus obtained by its interruption.

Figure 1:
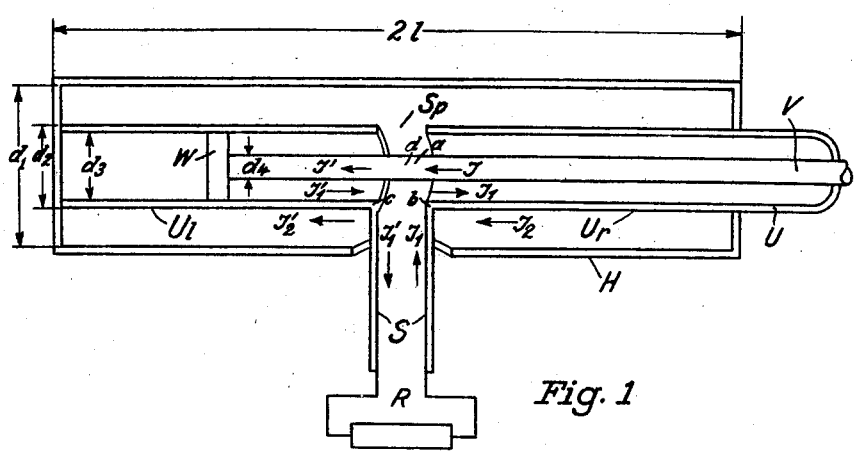
Figure 2:
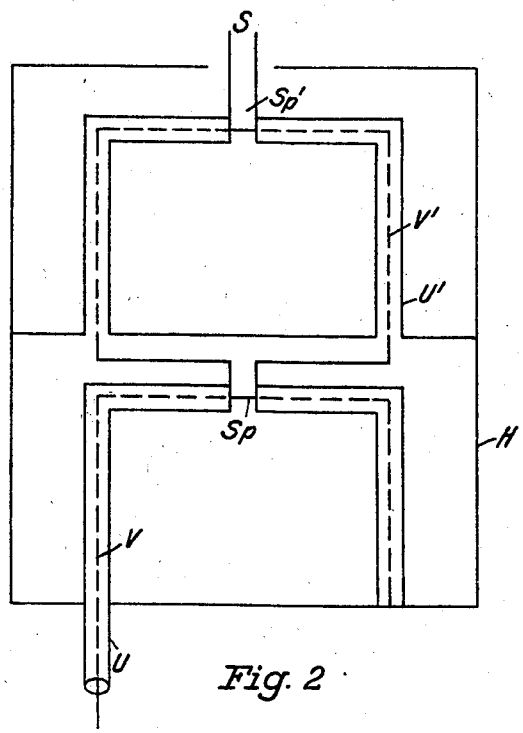
Figure 3:
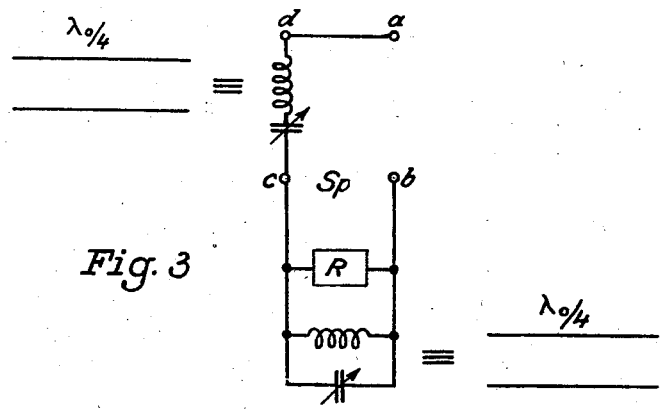
Figure 4:
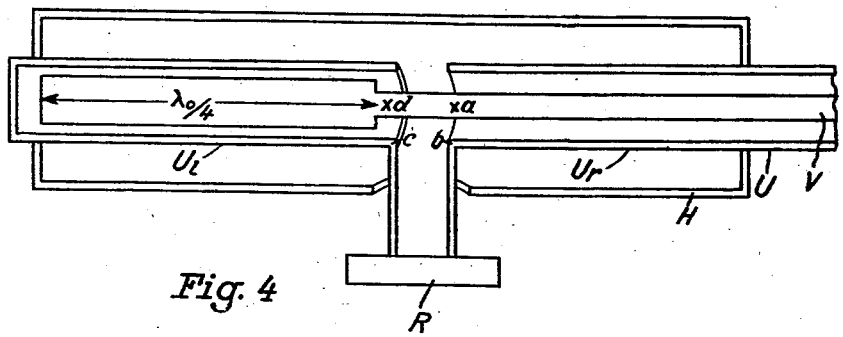
Figure 5:
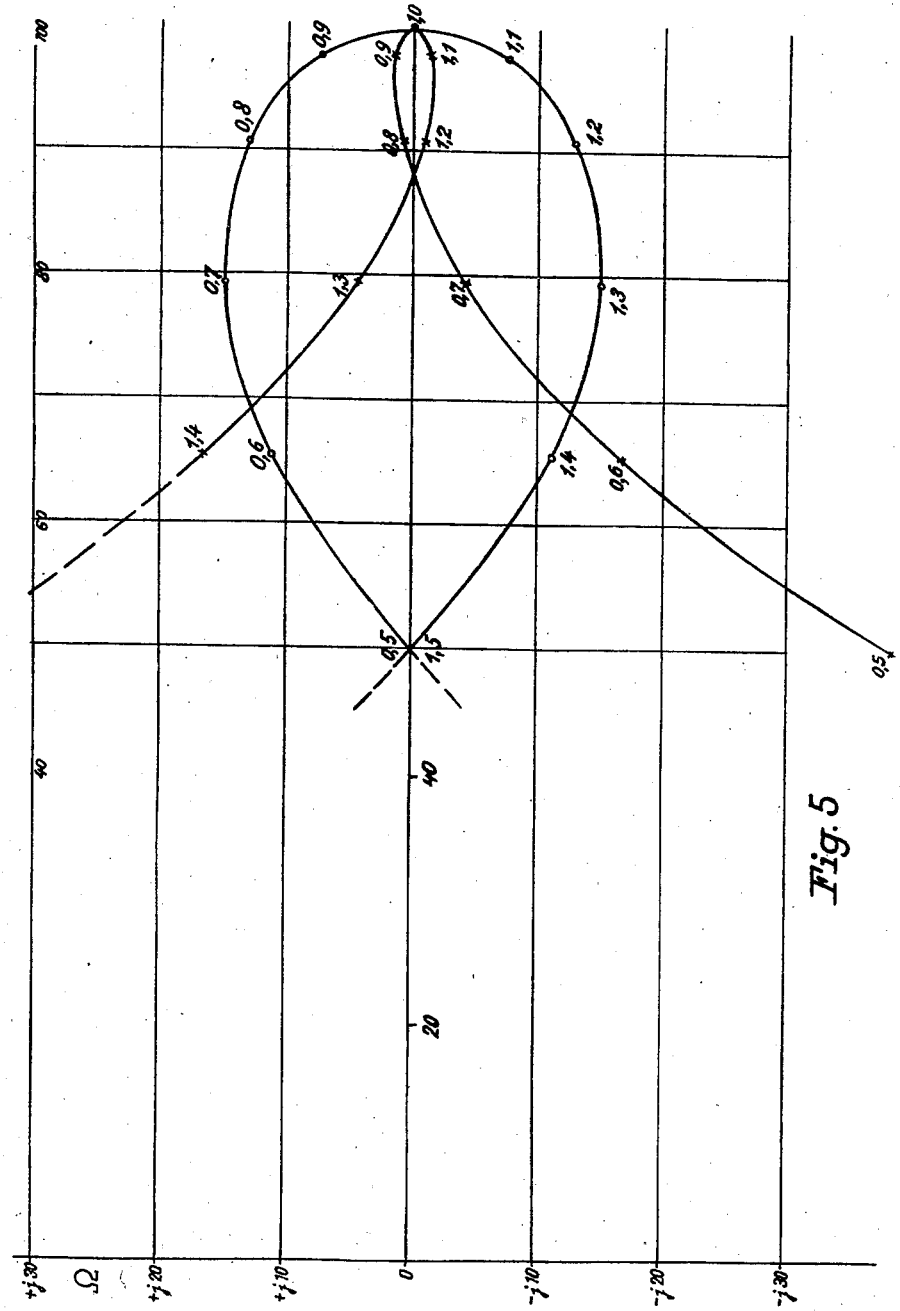
Figure 6:
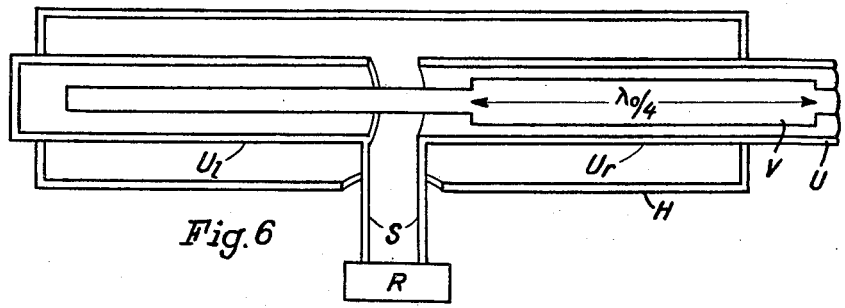
Figure 7:
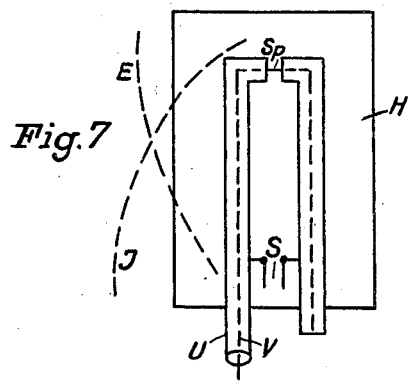
Figure 8:
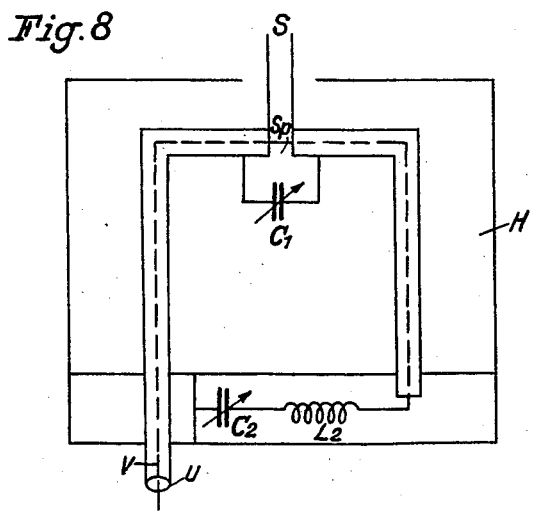

The aforementioned and other objects of the invention will be apparent from the following description when read in connection with the attached drawings, in which Fig. 1 shows one embodiment of the invention adapted for ultra-high frequency operation; Fig. 2 represents a further embodiment of the invention employing a plurality of transition means as shown in Fig. 1; Fig. 3 is an equivalent circuit diagram of Fig. 1; Fig. 4 is a further embodiment according to the invention adapted particularly for high frequency operation; Fig. 5 is a graph explanatory of the invention; while the Figs. 6 to 8 show further embodiments of the invention in order to obtain different transmission ratios.

The operating principle of the translating system according to the invention will now be more closely discussed in conjunction with Fig. 1 which shows an embodiment particularly designed for ultra-high frequency operation, that is, with wavelengths in the order of one or several decimeters. A not shown asymmetrical oscillation generator feeds asymmetrical energy along a coaxial transmission line comprising an outer conducting sheath U and a center conductor V. The outer conducting sheath U of this line has been interrupted at a position $Sp$ so as to form a gap between the two opposing ends of this sheath. The energy incoming along the coaxial transmission line U, V is derived from the two oppositely positioned ends of the outer conducting sheath and fed symmetrically with respect to a shell or sleeve H, preferably in the shape of a coaxial conducting sheath, along a line S to a load circuit. The shell H is electrically connected with the outer conducting sheath U. The part of the outer sheath U which is surrounded by the shell H has in order to obtain a better understanding been designed $U_1$ on the left and $U_r$ on the right hand with respect to the point $Sp$ of division. The center conductor V of the coaxial transmission line is electrically connected to the portion $U_1$ of the outer conducting sheath by means of a plunger disc W.

The energy transfer from an asymmetrical to a symmetrical state is based upon a specific action of the gap at $Sp$. When the coaxial conductor system mentioned above is concerned, the value of the current along the center conductor is equal to the value of the current flowing on the skin of the surrounding outer conductor. Now, the following condition is set up at the gap between the portions $U_1$ and $U_r$ of the outer conducting sheath of the transmission line U, V. Due to the interruption at $Sp$, the current $J_1$ flowing on the inner skin of the outer conductor is compulsorily caused to change its direction of flow and to follow the path $J_1$ along the right conductor of the line S and the path $J_2$ on the outer skin of the tubular conductor U. Since, as mentioned above, the current following the inner conductor is equal to that flowing along the skin of the outer conductor, the following relation is obtained $J = J_1 + J_2$. If the distance between the two opposite ends of the outer conductor is made sufficiently small with respect to the operating wavelength, then by reasons of continuity, the current $J$ on the inner conductor on entering the outer conductor portion $U_1$ is equal to the current $J_1$ leaving the outer conductor or portion $U_r$, or in other words, $J = J_1$. The current $J'$ entering the conductor portion $U_1$ has, as stated above, its equivalent on the inner skin of the conductor portion $U_1$, and by the same reasons, the left end of the gap $Sp$ transfers a current $J_1'$ to the left conductor of the line S and a current $J_2'$ along the outer skin of the conductor portion $U_1$. The desired transition from asymmetry to symmetry with respect to the shell or sleeve H is thus effected independent of frequency. The loop of the currents $J_2$ and $J_2'$ is closed by means of the shell H.

Of course, an unbalance with respect to the symmetry may occur, provided that the current $J$ flowing along the inner conductor V within the portion $U_r$ of the outer conductor differs from the current J' entering the conductor section $U_1$ by the reason that the center conductor V actually constitutes an impedance. Moreover, the symmetry may likewise be upset due to a capacitive coupling of the voltage on the center conductor V and the symmetrical line S through the gap $Sp$, since this voltage varies with the length of the line from V to $U_1$ and from V to $U_r$, or in other words, since a voltage difference may occur. These unbalancing influences may, however, be widely reduced by properly reducing the width of the gap $Sp$.

An arrangement adapted closely to approach perfect symmetry is shown in Fig. 2. This embodiment of the invention illustrates a plurality of transition means similar to that exemplified in Fig. 1, which means are connected in series with one another. An asymmetrical oscillation generator feeds its asymmetrical energy over a coaxial transmission line U, V. The outer conducting sheath U is interrupted to form a gap at $Sp$ and the energy is symmetrically derived from the two opposing ends of the divided outer sheath by means of two conductors. These conductors now constitute the inner conductor V' of a further coaxial transmission line U', V' which is again interrupted at $Sp'$ in order to obtain two opposing ends at which a perfectly symmetrical voltage with respect to the shell H is obtained. This symmetry is due to the fact that either a current maximum or a current minimum can occur at the gap $Sp'$ if this gap is symmetrically positioned.

The essential feature of this transition system is that the transmission of an impedance is accurately effected in accordance with the absolute value within a wide range of frequencies.

This condition will be explained by again referring to Fig. 1. At the end of the conductor section $U_r$ there is connected a resistor R and the impedance of the coaxial transmission line formed by the conductor section $U_r$ and the shell H occurs across the resistor R and has the value:

$$j \cdot \frac{1}{2} \cdot Z_1 \cdot tg \frac{\lambda}{4.2l}$$

in which $2l$ represents the length of the shell H, $\lambda$ the wavelength, and $$Z_1 = 138 \log \frac{d_1}{d_2}$$

In the last equation defining the value of $Z_1$, $d_1$ represents the inside diameter of the shell H and $d_2$ the outer diameter of the tubular conducting sheath U. To this impedance of the coaxial transmission line is added in series the impedance of the coaxial line section $U_1$, which is a function of its length, its termination and surge impedance $Z_2$ as obtained by the values of $d_3$ as the inner diameter of the outer conducting sheath U and $d_4$ as the outer diameter of the center conductor V.

The Fig. 3 illustrates the equivalent circuit diagram of the system shown in Fig. 1. The points $a$, $b$, $c$ and $d$ correspond to the points of equal designation in the Figs. 1 and 4. The impedance bridged across the resistor R, that is, the parallel circuit, is identical with a short-circuited coaxial transmission line or Lecher system having a length equal to $\lambda o/4$, while the impedance of the series circuit between the points $d$ and $c$ is identical with an open-circuited coaxial transmission line or Lecher system having a length equal to $\lambda o/4$, see Fig. 4. In the embodiment exemplified in the last mentioned figure, the center conductor V is not connected to the tubular section $U_1$ of the outer conducting sheath U. It is, however, obvious that the same current conditions are set up in this case as in the case of Fig. 1 heretofore explained.

In order to effect transmission of a resistance over as wide a frequency range as possible, the following dimensions have been found proper: length of the sheath H: $2l = \lambda o/2$, whereby $\lambda o$ denotes the mean value of the frequency band subject to transmission. In the tubular section $U_1$ the inner conductor V should be open-ended and have a length of $\lambda o/4$ as shown in Fig. 4. The value of $Z_1$ should be equal to 2.25 $Z_2$ for narrow and equal to 4 $Z_2$ for wide frequency bands.

By virtue of the fact that the impedance of the parallel circuit varies reciprocally with respect to that of the series impedance in response to frequency variations, the transmission of the resistance R may be secured over a wide frequency range by properly dimensioning these circuits.

The Fig. 5 shows the characteristic of the transmitted resistance as a function of frequency. In this graph the resistance encountered at the end of the tubular section $U_r$, that is, occurring at the points $a$ and $b$ in the Figs. 3 and 4 has been plotted against frequency. It will be seen from Fig. 5 that within the frequency range of $\pm 20$ per cent, the resistance may be transmitted with a reflection factor of 2.5 per cent. The curve through the small circles is plotted for a value of $Z_1$ equal to 4 $Z_2$ while that through the small crosses corresponds to a value of $Z_1$ which is equal to 2.25 $Z_2$. In both cases the relations $2l = \lambda o2$ and $Z_1 = 2R$ exists.

The system shown in Fig. 4 transmits the resistance R at a ratio of 1:1. It is, however, possible to secure another translation ratio of this resistance, for example, by using either of the arrangements shown in Figs. 6 and 7.

Fig. 6 shows a transmission system in which the value of $Z_1$ is so selected by a change of the inner conductor V that a given translation ratio of the resistance R is obtained. This change is effected according to Fig. 7 by properly adjusting the tapping points of the symmetrical line S along the outer conducting sheaths of the coaxial transmission line. At the gap $Sp$ a high voltage but no current prevails, while at the tapping points there is no voltage but a high current.

For longer wave operation, say with a wavelength between 3 and 10 meters, where a coaxial transmission line having a length of $\lambda/2$ would require too much space, an arrangement according to Fig. 8 would be preferred. The coaxial transmission lines are electrically prolonged by means of the capacities $C_1$ and $C_2$ and the inductance $L_2$ which results in a transmission of a frequency band in analogy with $Z_1$ and $Z_2$ in Fig. 4.

What is claimed is:

1. A system for effecting electrical energy transition from an asymmetrical high frequency energy transmission line to a symmetrical transmission line and vice versa for oscillations having a wavelength in the order of less than one meter, comprising a coaxial transmission line having a center conductor and an outer conducting sheath constituting the asymmetrical energy line, the outer conducting sheath of which is interrupted in front of the end at which radiation is suppressed so as to form an annular gap which divides the outer sheath of said coaxial line into two sections, and the center conductor of which extends across said gap and projects into the section of the outer sheath remote from the end from which the asymmetrical energy is fed, and means connected to the opposing ends of the said gap for symmetrically deriving electrical energy from said ends.

2. A system for effecting electrical energy transition from an asymmetrical high frequency energy transmission line to a symmetrical transmission line and vice versa for oscillations having a wavelength in the order of less than one meter, comprising a coaxial transmission line having a center conductor and an outer conducting sheath constituting the asymmetrical energy line, the outer conducting sheath of which is interrupted in front of the end at which radiation is suppressed so as to form an annular gap which divides the outer sheath of said coaxial line into two sections, and the center conductor of which extends across said gap and projects into the section of the outer sheath remote from the end from which the asymmetrical energy is fed, a conductive shell surrounding said outer conducting sheath in a position symmetrical with respect to said gap, conductive means at the ends of said shell for electrically connecting said shell with said outer conducting sheath and means connected to the opposing ends of said gap for symmetrically deriving electrical energy from said ends.

3. A system according to claim 2, wherein said coaxial transmission line is open-ended behind said gap and tuned to an electrical length of one quarter of the mean operating wavelength.

4. A system according to claim 2, wherein said shell is positioned coaxially with respect to said outer conducting shell and has an electrical length equal to one-half of the mean operating wavelength.

5. A system for effecting electrical energy transition from an asymmetrical high frequency energy transmission line to a symmetrical transmission line and vice versa for oscillations having a wavelength in the order of or less than one meter, comprising a coaxial transmission line having a center conductor and an outer conducting sheath constituting the asymmetrical energy line, the outer conducting sheath of which is interrupted in front of the end at which radiation is suppressed so as to form an annular gap which divides the outer sheath of said coaxial line into two sections, and the center conductor of which extends across said gap and projects into the section of the outer sheath remote from the end from which the asymmetrical energy is fed, a conductive shell surrounding said outer conducting sheath in a position symmetrical with respect to said gap, means connected to the opposite ends of said gap for symmetrically deriving electrical energy from said ends, and a resistance connected across said means, the diameter of said outer conducting sheath, said center conductor and said shell being so dimensioned that the value of the resistance connected across said means is transmitted in a fixed relation within a given range of frequencies.

6. A system according to claim 5, wherein means are provided for variably tapping the said symmetric line from the outer conducting sheath of the coaxial transmission line in order to provide a given ratio of transmission for the resistance R within an adjustable range of frequencies.

7. A system for effecting electrical energy transition from an asymmetrical high frequency energy transmission line to a symmetrical transmission line and vice versa for oscillations having a wavelength in the order of several meters, comprising a coaxial transmission line having a center conductor and an outer conducting sheath constituting the asymmetrical energy line, the outer conducting shell of which is interrupted in front of the end at which radiation is suppressed so as to form an annular gap which divides the outer sheath of said coaxial line into two sections, and the center conductor of which extends across said gap and projects into the section of the outer sheath remote from the end from which the asymmetrical energy is fed, means connected to the opposing ends of said gap for symmetrically deriving electrical energy from said ends, means provided at the end of said coaxial transmission line for electrically prolonging said line comprising a series circuit and a capacity bridged across said gap.

8. A system according to claim 1, wherein several energy transition systems are interconnected in series.

JOACHIM GOLDMANN.